United States Patent
Iwata

(10) Patent No.: US 11,509,625 B2
(45) Date of Patent: Nov. 22, 2022

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Toshihiro Iwata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/403,829

(22) Filed: May 6, 2019

(65) Prior Publication Data

US 2019/0356628 A1 Nov. 21, 2019

(30) Foreign Application Priority Data

May 15, 2018 (JP) .............................. JP2018-093977

(51) Int. Cl.
*H04L 61/4511* (2022.01)
*H04L 45/745* (2022.01)
(Continued)

(52) U.S. Cl.
CPC ........ *H04L 61/4511* (2022.05); *H04J 3/0667* (2013.01); *H04L 45/745* (2013.01); *H04L 61/5014* (2022.05)

(58) Field of Classification Search
CPC . H04L 12/46; H04L 41/0806; H04L 43/0811; H04L 45/125; H04L 61/1511;
(Continued)

(56) References Cited

U.S. PATENT DOCUMENTS 11,048,452 B2 * 6/2021 Sato ...................... H04L 61/106
11,194,525 B2 * 12/2021 Takamoto ............. G06F 3/1285
(Continued)

FOREIGN PATENT DOCUMENTS

CN 101849404 A 9/2010
CN 103475655 A 12/2013
(Continued)

OTHER PUBLICATIONS

May 7, 2021 Chinese Office Action, which is enclosed with an English Translation, that issued in Chinese Patent Application No. 201910397967.0.
(Continued)

*Primary Examiner* — Kevin T Bates
*Assistant Examiner* — Ranjan Pant
(74) *Attorney, Agent, or Firm* — Cowan, Liebowitz & Latman, P.C.

(57) ABSTRACT

A communication apparatus sets a first obtaining method for obtaining IP addresses of a first network interface and an external server with which the communication apparatus communicates via the first network interface, and a second obtaining method for obtaining IP addresses of a second network interface and an external server with which the communication apparatus communicates via the second network interface. If the first obtaining method is manual obtaining, if the second obtaining method is automatic obtaining, and if setting of a default gateway has been set with respect to the first network interface, the communication apparatus controls communications by using at least the IP address of the second network interface obtained by the automatic obtaining without using the IP address of the external server obtained by the automatic obtaining via the second network interface.

7 Claims, 7 Drawing Sheets

(51) Int. Cl.
  *H04J 3/06* (2006.01)
  *H04L 61/5014* (2022.01)
(58) Field of Classification Search
  CPC ... H04L 61/2015; H04L 45/745; H04L 45/74; H04L 45/741; H04L 61/4511; H04L 61/5014; H04N 21/4383; H04W 24/02; H04W 48/18; H04W 76/10; H04W 84/22; H04W 88/10; H04W 72/1215; H04W 88/06; H04J 3/0667
  See application file for complete search history.

(56) References Cited

U.S. PATENT DOCUMENTS

| | | | |
|---|---|---|---|
| 2004/0184458 A1 | 9/2004 | Shimada | |
| 2006/0069807 A1* | 3/2006 | Tagawa | H04L 41/0806 709/224 |
| 2009/0070675 A1* | 3/2009 | Li | G06Q 20/12 715/716 |
| 2011/0238823 A1* | 9/2011 | Yamada | G06F 3/1285 709/224 |
| 2014/0362864 A1* | 12/2014 | Sugimoto | H04L 45/24 370/400 |
| 2016/0253134 A1* | 9/2016 | Nakai | H04L 61/6059 358/1.15 |
| 2018/0191740 A1* | 7/2018 | Decenzo | H04L 63/1408 |
| 2020/0394000 A1* | 12/2020 | Takamoto | G06F 3/1254 |
| 2021/0407279 A1* | 12/2021 | Baum | H04L 41/0886 |

FOREIGN PATENT DOCUMENTS

| | | | | |
|---|---|---|---|---|
| CN | 106549798 A | | 3/2017 | |
| CN | 107547665 A | | 1/2018 | |
| JP | 2004-310194 A | | 11/2004 | |
| JP | 2009-111688 | * | 5/2009 | |
| JP | 2009-111688 A | | 5/2009 | |
| JP | 2018-064167 A | | 4/2018 | |
| JP | 2019171690 A | * | 10/2019 | G09B 5/04 |
| WO | 2009/057477 A1 | | 5/2009 | |

OTHER PUBLICATIONS

Feb. 4, 2022 Japanese Office Action, which is enclosed without an English Translation, that issued in Japanese Patent Application No. 2018-093977.

Keiichi, Yamachika, Signs of trouble as learned from testing and countermeasures therefor; You can easily pinpoint the root cause if you know the signs of trouble from Windows network trouble simulations!, Network World, vol. 10, No. 7, Japan, IDG Japan, Inc., vol. 10.

* cited by examiner

FIG. 5

| NETWORK ADDRESS SETTING METHOD OF MAIN I/F | SERVER SETTING METHOD | VALID SETTING OR INVALID SETTING |
|---|---|---|
| MANUAL SETTING | MANUAL SETTING | VALID SETTING |
| | DHCP | INVALID SETTING |
| DHCP | MANUAL SETTING | VALID SETTING |
| | DHCP | VALID SETTING |

| COMMON NETWORK SETTING SCREEN | |
|---|---|
| SELECTION OF MAIN INTERFACE | WIRED LAN ▼  *601* |
| IP ADDRESS SETTING METHOD : | MANUAL |
| DEFAULT GATEWAY : | 192.168.100.1 |
| DNS SERVER SETTING | *602* |
| IP ADDRESS | MANUAL ▼ |
| NAME SERVER ADDRESS 1 : | |
| NAME SERVER ADDRESS 2 : | |
| NTP SERVER SETTING | *603* |
| IP ADDRESS | MANUAL ▼ |
| NTP SERVER ADDRESS : | |

[ SETTING ]

| COMMON NETWORK SETTING SCREEN | |
|---|---|
| SELECTION OF MAIN INTERFACE | WIRED LAN ▼  *611* |
| IP ADDRESS SETTING METHOD : | MANUAL |
| DEFAULT GATEWAY : | 192.168.100.1 |
| DNS SERVER SETTING | *612* |
| IP ADDRESS : | DHCP ▼ |
| NAME SERVER ADDRESS 1 : | |
| NAME SERVER ADDRESS 2 : | |
| NTP SERVER SETTING | *613* |
| IP ADDRESS : | MANUAL ▼ |
| NTP SERVER ADDRESS : | |

*614* — ※ SINCE IP ADDRESS SETTING METHOD OF MAIN I/F IS "MANUAL", AUTOMATIC SETTING (DHCP) CANNOT BE SET

[ SETTING ]

COMMUNICATION APPARATUS, CONTROL METHOD, AND COMPUTER-READABLE STORAGE MEDIUM

BACKGROUND OF THE INVENTION

Field of the Invention

The present invention relates to setting processing in a communication apparatus including a plurality of network interface.

Description of the Related Art

In recent years, a monitoring system using a network camera has become widespread. In addition, the network camera can include a plurality of network interfaces like a model in which a wireless LAN interface is mounted in addition to a wired LAN interface in order to, for example, improve installability. Such network camera can be variously operated using the plurality of network interfaces in parallel.

In an apparatus including a plurality of network interfaces, a default route can be set for each network interface. For example, a general apparatus such as a PC holds a routing table inside, and can switch a default route dynamically by setting priority levels for the plurality of default routes set for the respective network interfaces. On the other hand, if an apparatus for which it is important to continuously perform communication, such as a network camera that constantly distributes a video by recording and distribution or the like, switches the default route dynamically, communication is unwantedly interrupted, causing a problem that, for example, a service cannot be continued. To solve this problem, Japanese Patent Laid-Open No. 2009-111688 describes a technique in which an apparatus including a plurality of network interfaces holds path information for each interface, and uses the default route of a main interface even if a sub interface is connected.

However, the technique described in Japanese Patent Laid-Open No. 2009-111688 assumes that the communication path is appropriately switched, and does not consider a use case in which the main interface and the sub interface are used in parallel.

SUMMARY OF THE INVENTION

The present invention provides a mechanism of preventing a default route from being switched dynamically in an apparatus including a plurality of network interfaces while using the network interfaces in parallel.

According to one aspect of the present invention, there is provided a communication apparatus including at least a first network interface and a second network interface, comprising: a default gateway setting unit configured to make a setting of a default gateway with respect to one of the first network interface and the second network interface; an obtaining method setting unit configured to set a first obtaining method for obtaining an IP address of the first network interface and an IP address of an external server with which the communication apparatus performs communication via the first network interface, and a second obtaining method for obtaining an IP address of the second network interface and an IP address of an external server with which the communication apparatus performs communication via the second network interface; and a communication control unit configured to control communications using the first network interface and the second network interface, wherein the obtaining method setting unit can set, as a method for obtaining an IP address, one of manual obtaining for setting an IP address input by a user and automatic obtaining in which a router connected to the network interface sets an IP address, and if the first obtaining method is set to the manual obtaining, the second obtaining method is set to the automatic obtaining, and the setting of the default gateway has been set with respect to the first network interface, the communication control unit controls communications using the plurality of network interfaces by using at least the IP address of the second network interface obtained by the automatic obtaining without using the IP address of the external server obtained by the automatic obtaining via the second network interface.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a table showing an example of a determination table for determining whether a server setting is valid;

FIGS. 6A and 6B are views each showing an example of a server setting screen;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Configuration)

Figure 1:
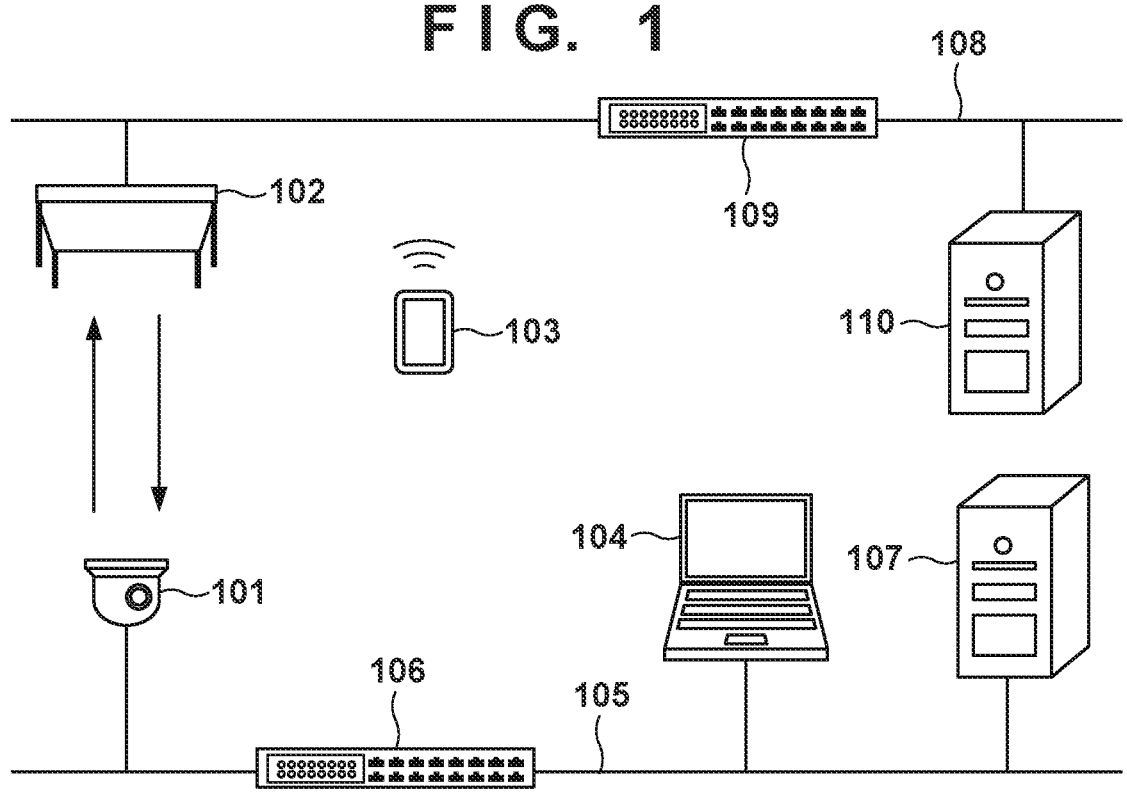
FIG. 1 is a view showing an example of the configuration of a monitoring system.

FIG. 1 is a view showing an example of the configuration of a monitoring system according to an embodiment of the present invention. In one example, the monitoring system is formed by including a network camera 101, an access point 102, a mobile terminal 103, and an information terminal 104. The network camera 101 includes a plurality of network interfaces, and is connected to a first network 105 using a wired LAN interface and connected to a second network 108 using a wireless LAN interface. The first network 105 that is connected to the network camera 101 using the wired LAN interface includes a first router 106, and the network camera 101 can communicate with a first server 107 via the first router 106, as needed. The second network 108 that is connected to the network camera 101 using the wireless LAN interface includes a second router 109, and the network camera 101 can communicate with the information terminal 104 and a second server 110 via the second router 109, as needed.

The network camera according to this embodiment performs various operations using the plurality of network interfaces in parallel. For example, the wired LAN (first network 105) in which communication is stable is used for distribution of a recorded video, and the wireless LAN (second network 108) in which communication is relatively unstable is used by a visitor in an event venue or the like to, for example, temporarily monitor a video of the camera. In this case, the network (first network 105) that is restricted under high security for distribution of a recorded video can be discriminated from the network (second network 108) that is open to the public so that any event visitor can perform communication. Note that this is merely an example, and the wireless LAN (second network 108) may be used for distribution of a recorded video and the wired LAN (first network 105) may be used by a visitor in an event venue or the like to, for example, temporarily monitor a video of the camera. Note that in one example, the wired LAN is used for distribution of a recorded video and the wireless LAN is used for temporary monitoring or the like. These networks are set as different network segments. In one example, the first network 105 is restricted under high security to limit connectable apparatuses, and the second network 108 is open to the public so that anyone can perform communication.

This embodiment assumes that the network camera 101 constantly distributes a video by recording and distribution or the like. Thus, it is important to prevent a default route from being switched dynamically in the network camera 101. To achieve this, the network camera 101 sets one network interface as an interface (main interface) used preferentially, thereby limiting an interface that can perform communication via the default route. The interface (sub interface) other than the main interface of the network camera 101 is set not to perform communication via the default route, and a communicable range is restricted only within the same network segment.

Note that in this embodiment, the network camera 101 can perform communication using the two network interfaces of the wired and wireless LAN interfaces in parallel. The present invention, however, is not limited to this. For example, the network camera 101 may include three or more network interfaces such as wireless and wired communication interfaces complying with a plurality of different communication standards. In this embodiment, the network camera 101 has a function of performing connection to the access point 102 as, for example, a wireless LAN terminal (STA) complying with the IEEE802.11 standard series. Note that, for example, the network camera 101 may have an ability to function as an access point, and may establish, by a wireless LAN, connection to another apparatus operating as an STA.

The access point 102 shown in FIG. 1 performs wireless communication by establishing wireless connection to a communication apparatus (network camera 101 or mobile terminal 103) operating as a wireless LAN terminal. Furthermore, the access point 102 can be connected to the second router 109 or the like by, for example, wired connection, and relay communication between the communication apparatus to which wireless connection has been established and another apparatus (for example, the second server 110) on the network. The mobile terminal 103 and the information terminal 104 have a function of outputting image information captured by the network camera 101 using, for example, a browser application, and a function of controlling the network camera 101. Note that for example, the mobile terminal 103 can be set so as to primarily monitor a video captured by the network camera 101 but not to operate the network camera 101. However, for example, the mobile terminal 103 may be allowed to operate the network camera 101. At this time, only the mobile terminal 103 that has undergone predetermined authentication may be allowed to perform such operation.

The first network 105 is a network used to distribute, for recording, a video captured by the network camera 101. The first router 106 is a router existing on the first network 105, and the first server 107 can communicate with an apparatus connected to the first network 105 via the first router 106. The first router 106 at least operates as the default gateway of the network camera 101, has a DHCP function of assigning an IP address, and can notify, by the DHCP function, the network camera 101 of information of the first server 107. Note that DHCP is an acronym for "Dynamic Host Configuration Protocol". The first server 107 is, for example, a server that accumulates a video captured by the network camera 101. The second network 108 is a network that can be used to monitor a video of the network camera 101 on the mobile terminal 103 in real time. The second router 109 is a router existing on the second network 108, and the second server 110 can communicate with an apparatus connected to the second network 108 via the second router 109. The second router 109 can also notify, by the DHCP function, the network camera 101 of the information of the second server 110 and the like. In one example, the second server 110 can be a DNS server, an NTP server, an authentication server, a monitoring history management server, or the like. Note that DNS is an acronym for "Domain Name System" and NTP is an acronym for "Network Time Protocol".

Note that the configuration shown in FIG. 1 is merely an example. For example, although the access point 102 and the second router 109 have been described as separate devices, the access point 102 may have a router function. In addition, for example, although the network camera 101 is connected to another apparatus such as the first server 107 or the second server 110 via the first router 106 or the second router 109, the network camera 101 may be connectable without going through these routers. However, the network camera 101 is configured to perform, via a router, communication with at least some communication apparatuses such as remote apparatuses.

In the above description, the router assigns an IP address by DHCP. However, for example, an IP address may be automatically set by RA (Router Advertisement).

In this embodiment, in response to selection of the main interface, the network camera 101 makes a setting for the sub interface not to perform communication via the default route. For example, if the network camera 101 makes a network setting in the sub interface via DHCP, it sets an obtained network address (IP address), and does not use, for example, the setting information of the default gateway. This allows the network camera 101 to perform communication over the router with the main interface, and can prevent the default route from being switched dynamically since no default gateway is set in the sub interface. Furthermore, since, in the sub interface, no default gateway is set but the network address is set, it is possible to perform communication within a range not over the router. For example, the network camera 101 performs, over the first router 106, communication with the information terminal 104 and the first server 107 that are connected to the first network 105.

On the other hand, the network camera 101 can perform communication with an apparatus connected to the second network 108 within a range not over the second router 109. For example, the network camera 101 can communicate with the mobile terminal 103 connected to the access point 102. Note that unlike the network camera 101, the mobile terminal 103 can perform, over the second router 109, communication with the second server 110 connected to the second network 108. For example, this allows the mobile terminal 103 to undergo, for example, user authentication by the second server 110, and the network camera 101 may determine, based on a user authentication result, whether to allow connection from the mobile terminal 103. Furthermore, if authentication is performed in order for the mobile terminal 103 to perform connection to the network camera 101, a history such as an authentication result may be registered in the second server 110.

Note that the network camera 101 can switch the main interface while the connection state remains unchanged (for example, while connection by the wired LAN and connection by the wireless LAN remain established). For example, the information terminal 104 (or the mobile terminal 103) that controls the network camera 101 can switch the main interface by accepting a user operation via a user interface such as a screen for switching the main interface. This can prevent the communication path from being switched without a user's intention. In addition, if the setting information of the main interface before switching (that is, the sub interface after switching) is maintained when the main interface is switched, an inconvenience may be imposed. For example, if the setting of the DNS server or the NTP server is a setting of automatically obtaining an address by DHCP before switching, and is a setting of manually inputting the network address of the main interface after switching, the server cannot be accessed. Therefore, the user needs to consider a combination of a network address assigning method and a server setting method for each interface by sufficiently understanding the configuration of the network. However, the user may not have enough knowledge of the network, and setting that disables operation may be made. To cope with this, in this embodiment, the user is prompted to input an appropriate setting via a user interface such as a screen for setting the network camera 101. This can prevent setting that disables operation from being made.

Examples of the arrangement of the apparatus that performs such operation and the procedure of processing will be described below.

(Apparatus Arrangement)

Figure 2:
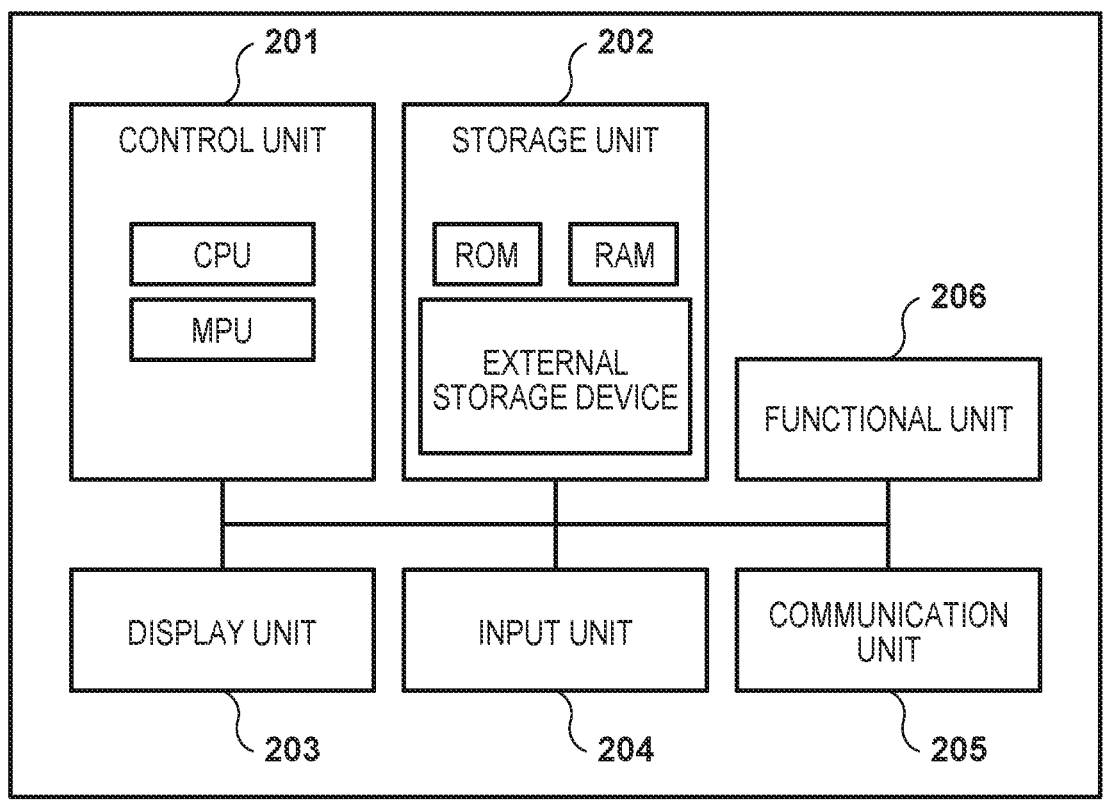
FIG. 2 is a block diagram showing an example of the hardware arrangement of a network camera.

FIG. 2 shows an example of the hardware arrangement of the network camera 101 according to this embodiment. In one example, the network camera 101 is formed by including a control unit 201, a storage unit 202, a display unit 203, an input unit 204, a communication unit 205, and a functional unit 206. Note that the components shown in FIG. 2 are merely examples. Some of the components shown in FIG. 2 may be omitted, or constituent elements may be added to the components shown in FIG. 2. In addition, a plurality of blocks shown in FIG. 2 may be integrated into one block, or one block shown in FIG. 2 may be divided into a plurality of blocks. Some or all of the components shown in FIG. 2 may be replaced with other constituent elements.

The control unit 201 executes programs stored in, for example, the storage unit 202, thereby performing overall control of the network camera 101 and various kinds of processing. In one example, the control unit 201 is formed by including at least one processor such as a CPU or an MPU. Note that the control unit 201 may perform overall control of the network camera 101 and various kinds of processing using another arbitrary processor such as a logic circuit implemented by an ASIC (Application Specific Integrated Circuit) or an FPGA (Field Programmable Gate Array). The storage unit 202 stores, for example, the programs to be executed by the control unit 201 and provides a work area used by the control unit 201 during execution of the programs. Note that the storage unit 202 is formed by including, for example, memories such as a ROM (Read Only Memory) and a RAM (Random Access Memory) and an external storage device such as a hard disk drive. The display unit 203 is formed by including, for example, a screen display function such as an LCD (Liquid Crystal Display) or an organic EL display and various kinds of functions of visually presenting information by a light emitting pattern of an LED (Light Emitting Diode) or the like. In addition, the display unit 203 may be formed by additionally including a device that presents information by a voice/sound. In one example, the network camera 101 can visually present various kinds of information to the user of the self-apparatus using light emitting patterns of the LED. The input unit 204 is formed by including, for example, operation acceptance devices such as a button, a 4-way selector, a touch panel, and a mouse. The input unit 204 converts the contents of a user operation into an electrical signal and notifies the control unit 201 of it. The communication unit 205 performs communication with another apparatus. In this embodiment, the communication unit 205 is formed by including at least one circuit such as a modulation and demodulation circuit for wired communication and at least one circuit such as a modulation and demodulation circuit for wireless communication. Note that at least part of the circuit for wired communication may be shared with part of the circuit for wireless communication. The functional unit 206 performs control for executing the function of the network camera 101. That is, the functional unit 206 includes a lens and an image sensor for performing image capturing by the network camera 101, and captures an object and converts an image capturing result into an electrical signal. Furthermore, the functional unit 206 (or the control unit 201) performs processing for generating image data by executing image processing and encoding processing based on the electrical signal representing a captured image. Note that the functional unit 206 may execute another function such as recording and voice processing. For example, the image captured via the functional unit 206 is output to the first network 105 and the second network 108 via the communication unit 205. Furthermore, for example, if a control signal is received from the information terminal 104 via the communication unit 205, a setting such as a change of an image capturing range by the functional unit 206 can be made under the control of the control unit 201.

Note that the mobile terminal 103, the information terminal 104, the first server 107, and the second server 110 each have similar hardware arrangements. Note also that the functional unit 206 is configured to execute different processes in correspondence with the functions of these apparatuses.

Furthermore, for example, each of the mobile terminal 103 and the information terminal 104 can communicate with the network camera 101 via the communication unit 205, thereby setting the network camera 101. For example, each of the mobile terminal 103 and the information terminal 104 executes an application (for example, a browser) for setting the network camera 101 by the control unit 201, thereby displaying a setting screen on the display unit 203. Then, upon accepting a user operation on the setting screen, each of the mobile terminal 103 and the information terminal 104 transmits a command corresponding to the user operation to the network camera 101 via the communication unit 205. The network camera 101 controls the functional unit 206 in accordance with the command, thereby making it possible to execute image capturing processing according to the user operation.

Figure 3:
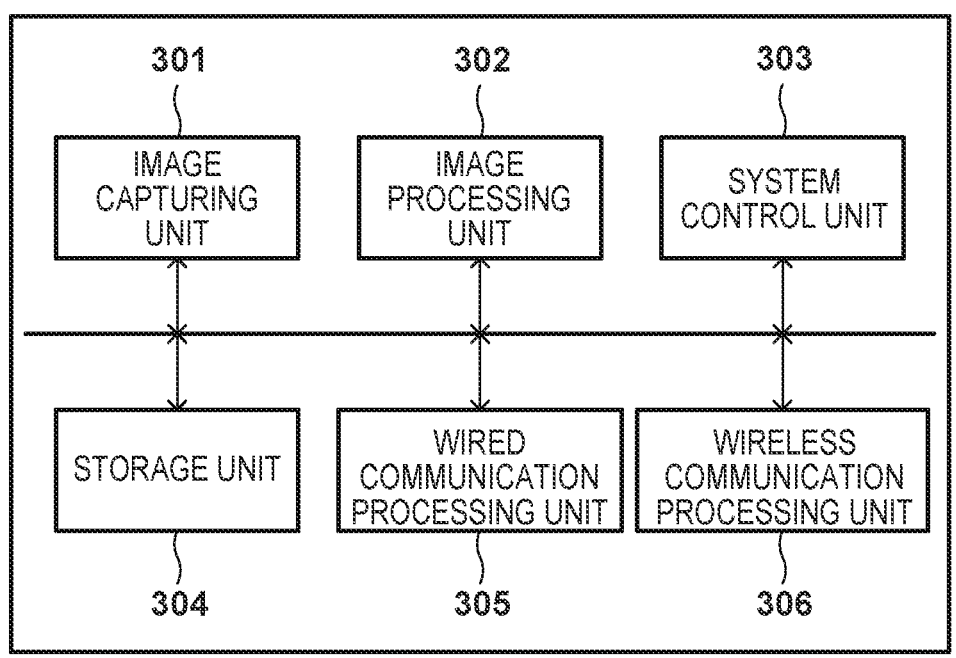
FIG. 3 is a block diagram showing an example of the functional arrangement of the network camera.

FIG. 3 shows an example of the functional arrangement of the network camera 101 according to this embodiment. The network camera 101 includes, as examples of its functions, an image capturing unit 301, an image processing unit 302, a system control unit 303, a storage unit 304, a wired communication processing unit 305, and a wireless communication processing unit 306. The image capturing unit 301 captures an object and converts an image capturing result into an electrical signal. The image processing unit 302 performs image processing and compression encoding processing based on the electrical signal converted by the image capturing unit 301, thereby generating image data. The system control unit 303 analyzes the command transmitted to the network camera 101 to perform processing in accordance with the command. For example, in accordance with the command received from the information terminal 104, the system control unit 303 sets an image capturing range (pan/tilt/zoom) of the network camera 101. The storage unit 304 stores setting values such as an image quality adjustment parameter and a network setting value. With the setting values, the network camera 101 can be activated using the precedingly set values when, for example, it is reactivated. The wired communication processing unit 305 performs various kinds of processing associated with communication via the wired LAN. The wireless communication processing unit 306 performs various kinds of processing associated with communication via the wireless LAN.

The mobile terminal 103, the information terminal 104, the first server 107, and the second server 110 have a function as a general-purpose computer, and a detailed description of the functional arrangement thereof will be omitted. However, at least the mobile terminal 103 and the information terminal 104 have a function of obtaining a video from the network camera 101 (directly or via another apparatus or the like) and displaying the obtained video (or a function of displaying the video on an external display device). The mobile terminal 103 and the information terminal 104 can also have a function of displaying a user interface such as a screen for setting the network camera 101 and accepting a user operation via the user interface.

(Procedure of Processing)

Figure 4:
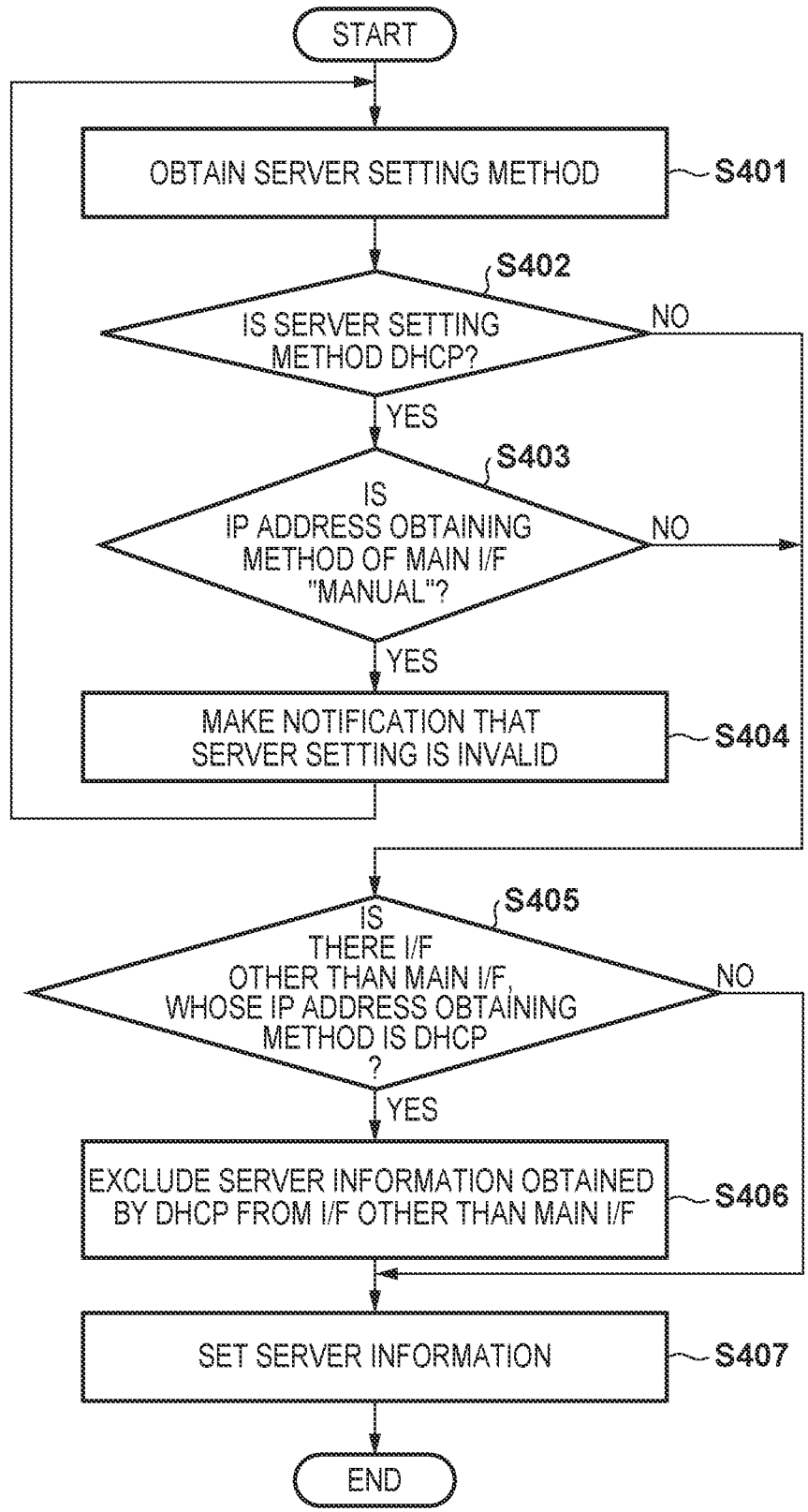
FIG. 4 is a flowchart illustrating an example of the procedure of processing executed by the network camera.

An example of the procedure of processing executed by the network camera 101 according to this embodiment will be described with reference to FIG. 4.

First, the system control unit 303 obtains information of a server setting method stored in the storage unit 304 (step S401). The server setting method is a method of obtaining the network address of the server. For example, the DNS server or the NTP server can automatically obtain the network address of the server by the DHCP function. The network camera 101 can receive, via the network, the setting which has been input by the user and accepted via the user interface such as the browser in the information terminal 104. This allows the user to manually input the network address of the server as the setting in the network camera 101. In this embodiment, when the user sets one of the automatic setting by the DHCP function and the manual setting by the user, the network address setting method of the server is decided. Then, the decided setting method and the network address of the server set by the setting method are stored in the storage unit 304.

Subsequently, with reference to the storage unit 304, the system control unit 303 determines whether the server setting method is the automatic setting by the DHCP function (step S402). If the server setting method is the automatic setting by the DHCP function (YES in step S402), the system control unit 303 determines, with reference to the storage unit 304, whether the network address obtaining method of the main interface is the manual input (manual) (step S403). Then, if the network address obtaining method of the main interface is the manual input (manual) (YES in step S403), the system control unit 303 notifies the user that the server setting is invalid (step S404), and returns the process to step S401. Note that if the server setting method is the manual setting (NO in step S402) or the network address obtaining method of the main interface is the automatic input (NO in step S403), the system control unit 303 advances the process to step S405. As described above, the user is notified of the invalid server setting in step S404, thereby prompting the user to make an appropriate setting. If an appropriate setting is made, the process advances to step S405. Note that if, for example, the user closes the setting screen in a state in which no appropriate setting is made, the process may be terminated without making a setting.

Note that the order of the determination processes in step S402 and S403 may be reversed. Furthermore, the system control unit 303 may hold a determination table shown in FIG. 5, and may collectively determine, based on the server setting method and the network address obtaining method of the main interface, whether the server setting is valid or invalid. FIG. 5 shows a case in which if the network address obtaining method of the main interface is the manual setting and the server setting method is set to the automatic setting by DHCP, the server setting is invalid; otherwise, the setting is valid. Note that an arbitrary method capable of determining, based on the information of the network address obtaining method of the main interface and the information of the server setting method, whether the setting is valid or invalid may be used.

In step S405, the system control unit 303 determines whether the network address setting method of the sub interface is the automatic setting by the DHCP function. If the network address setting method of at least one sub interface is the automatic setting by the DHCP function (YES in step S405), the system control unit 303 excludes the server information received by the sub interface by the DHCP function (step S406). Then, the system control unit 303 advances the process to step S407. On the other hand, if it is determined that the network address setting methods of all the sub interfaces are the manual setting (NO in step S405), the system control unit 303 advances the process to step S407 without executing the processing in step S406. In step S407, the system control unit 303 stores the set server information in the storage unit 304, thereby ending the processing.

An example of a method of notifying, in step S404, the user that the server setting is invalid will be described with reference to FIGS. 6A, 6B, and 7. In this embodiment, the mobile terminal 103 or the information terminal 104 makes a notification of information about the server setting by the user interface that outputs the information of the network camera 101. FIGS. 6A and 6B each show an example of the user interface. As shown in FIG. 6A, a setting page 600 for making the network setting of the main interface and settings associated with the servers includes a region 601 for setting the main interface from displayed options using a dropdown button. The setting page 600 also includes a region 602 for inputting information about the DNS server and a region 603 for inputting information about the NTP server. When the user inputs information to these regions, the setting of the main interface and the settings associated with the servers can be made. The same applies to a setting page 610 shown in FIG. 6B.

If it is determined, based on a combination of the network address setting method of the main interface and the server setting method, that the server setting is valid, the setting page 600 shown in FIG. 6A is displayed. On the other hand, if it is determined, based on a combination of the settings, that the server setting is invalid, a problematic portion such as a region 612 shown in FIG. 6B is filled with a color such as gray, and an error message 614 is output, thereby notifying the user that the invalid setting is made. Note that for display of the problematic portion, arbitrary highlighting that makes it easy to visually perceive the portion can be used. For example, in addition to or instead of the change of the color of the region 612 as described above, processing of changing the color of text "IP address" to red or the like or displaying the text in bold may be performed. The error message 614 may be displayed at a position different from that shown in FIG. 6B, such as a position between the portion of "default gateway" associated with the main interface and the portion of "DNS server setting". Alternatively, the error message itself need not be displayed. When, for example, a region 611 is selected, a message of, for example, "setting of IP address of DNS server is not correct" may be displayed around the region 611. In this way, display is switched in accordance with the contents input by the user, thereby making it possible to notify, in step S404, the user that the setting is invalid.

For example, with reference to FIG. 6B, if the main interface is switched from the wireless LAN to the wired LAN in the region 611, the system control unit 303 obtains the IP address setting method (in this example, "manual") of the wired LAN. Then, the system control unit 303 also obtains the default gateway set in the main interface, and displays the obtained information. Assume, for example, that the information (in this example, "DHCP") of the DNS server setting before switching or the like is displayed. The combination of the IP address obtaining method (manual) of the main interface and the server setting method (DHCP) is invalid, as shown in the table of FIG. 5. Therefore, the system control unit 303 grays out the DNS server setting region like the region 612. Such processing can be executed while maintaining the connection state. That is, in a state in which both the wired connection and the wireless connection are established, when the user changes the main interface, the processing shown in FIG. 4 can be executed. If the main interface is not changed, when the IP address setting method of the DNS server or the NTP server is operated, the processing shown in FIG. 4 can be executed. As described above, for example, every time one of the items of the setting screen is changed, the processing shown in FIG. 4 can be executed.

Figure 7:
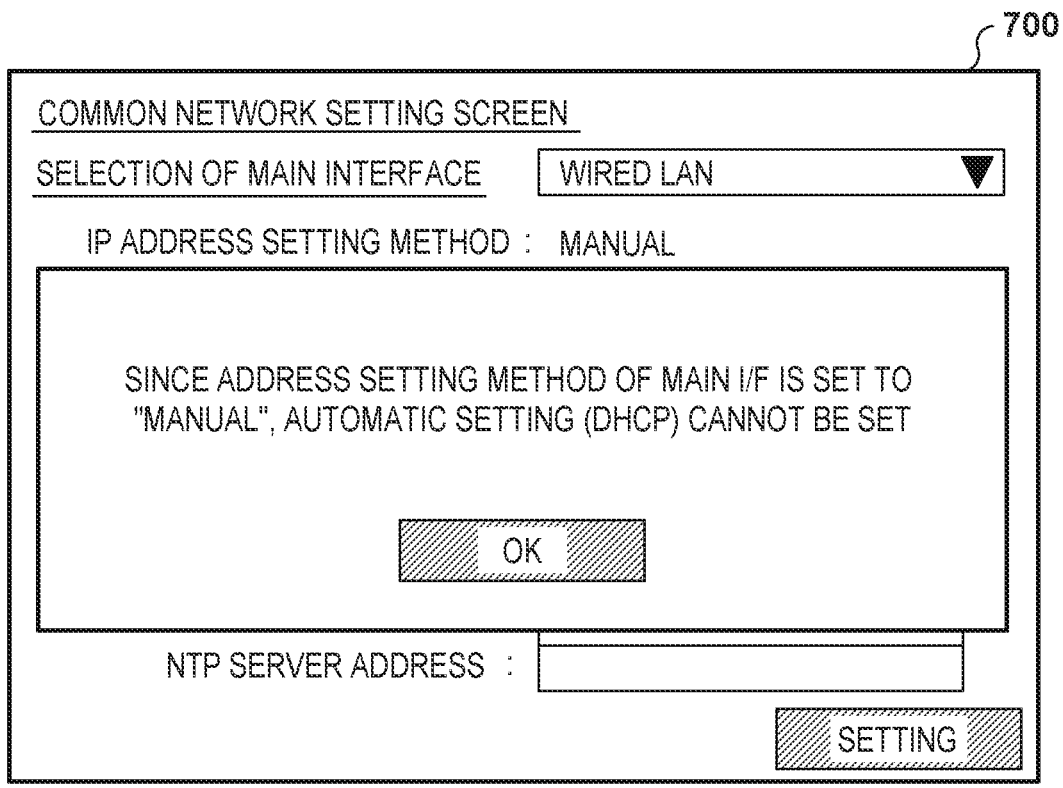
FIG. 7 is a view showing an example a popup message when an invalid setting is made in the server setting screen.

In step S404, as shown in FIG. 7, a pop-up may be displayed on a setting page 700, thereby notifying the user that the setting is invalid. For example, when one of the items of the setting screen is changed to select the invalid setting combination, the pop-up may be displayed, or when a "setting" button is pressed in a state in which the invalid setting combination is selected, the pop-up may be displayed. As described above, predetermined display in various formats can be performed so as not to make the network setting in a state in which the invalid setting combination is selected. Note that together with or instead of the predetermined display, predetermined voice output or predetermined vibration output may be performed. That is, predetermined information notification for indicating, to the user, that the invalid setting combination has been selected suffices, and the screen need not always be displayed.

Note that the notification processing in step S404 may be performed by a method other than the method of switching the display on the user interface. For example, if a setting is made by a network protocol without using the setting screen, a method of returning an error as a response or a method of making a notification of error contents to a preset mail address may be used.

Subsequently, a method of excluding the information received by DHCP in the sub interface in step S406 will be described with reference to FIG. 8. First, the wired communication processing unit 305 or the wireless communication processing unit 306 receives the information from the DHCP server (step S801), and the system control unit 303 stores all the received information in the storage unit 304 (step S802). The system control unit 303 determines whether the interface that has received the information in step S801 is the main interface or the sub interface (step S803).

If the interface that has received the information in step S801 is the sub interface (YES in step S803), the system control unit 303 obtains, as network setting information, only the network address from the information stored in the storage unit 304 (step S804). That is, if the information of the network address is obtained using DHCP, information including information of the default gateway is obtained in addition to the network address. This information can include information of the setting of the DNS server, the NTP server, or the like. To the contrary, for example, if the default gateway is set for the sub interface, the default route may be switched dynamically. Therefore, the information is not obtained from the storage unit 304 so as not to set the default gateway. At this time, it is considered that the sub interface has a connection relationship with the DNS server or the NTP server such that the sub interface cannot reach the server without going through the router, and thus information about the server is not obtained. Note that this is merely an example. As long as at least the default gateway is not set, for example, information other than the network address, such as server information, may be obtained. Then, for the sub interface, the system control unit 303 makes a network setting using the obtained network address for the sub interface (step S806).

On the other hand, if the interface that has received the information in step S801 is the main interface (NO in step S803), the system control unit 303 obtains all the information including the information of the default gateway from the storage unit 304 (step S805). Then, the system control unit 303 makes a network setting using all the obtained information of the network address, the default gateway, and the like (step S806).

Note that even information which has not been obtained in step S804 can be continuously held in the storage unit 304 without being deleted from the storage unit 304. Thus, if the main interface is switched, the network setting can be changed using the held information (for example, the information of the default gateway). Note that if the main interface is set to the sub interface, the information of the default gateway is deleted from the network setting. This can prevent the default route from being set on the sub interface side. Note that although the default gateway is not set for the sub interface by making the network setting for the sub interface using only the network address, communication within a range not through the router is possible.

Figure 8:
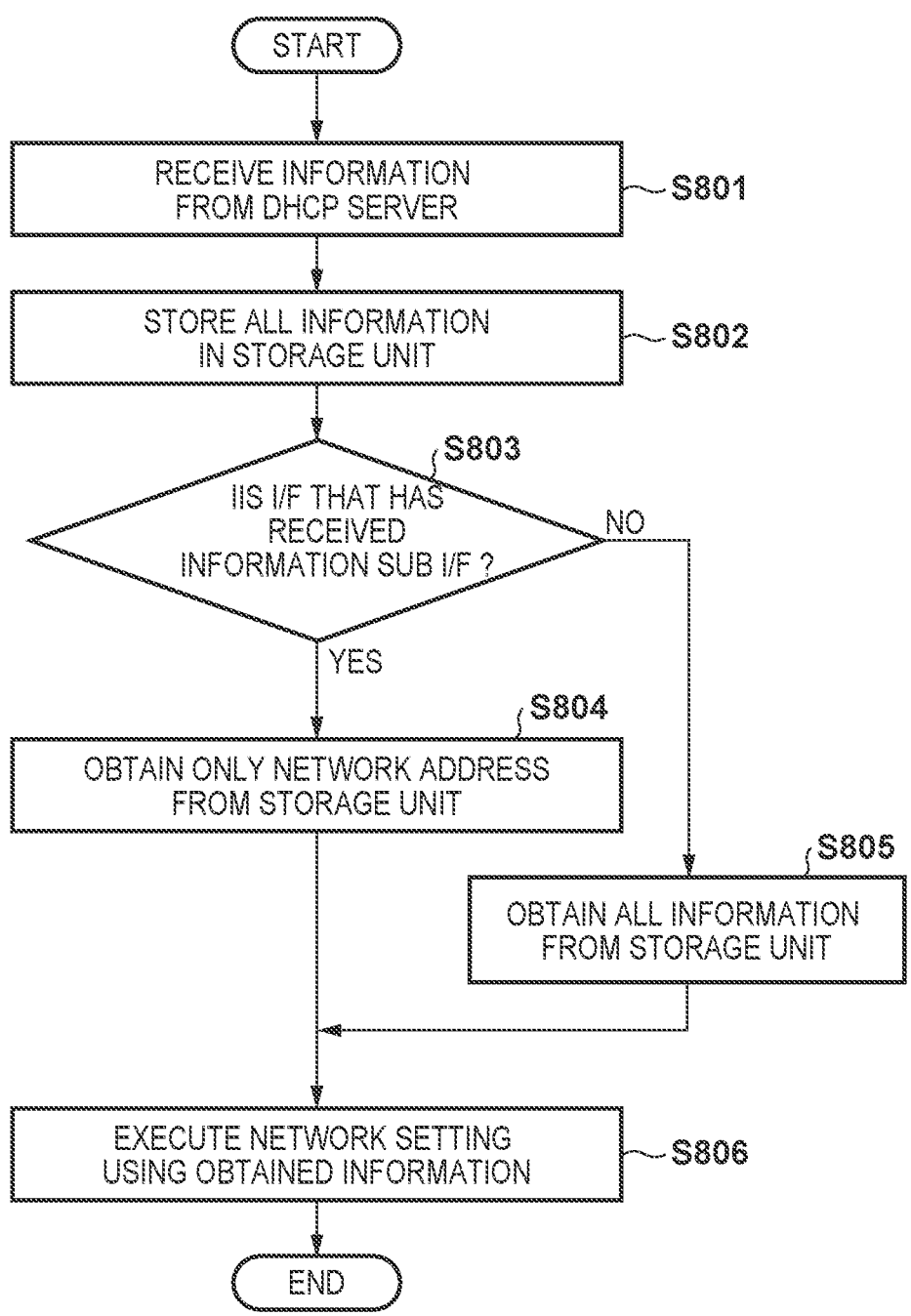
FIG. 8 is a flowchart illustrating an example of the procedure of network interface setting processing.

Note that the processing shown in FIG. 8 is merely an example, and an arbitrary method of preventing the information other than the network address included in the received information from being used for the network setting may be used instead. At this time, for example, part of the information may be used within a range that prevents the information of the default gateway from being used. That is, to prevent at least the information of the default gateway from being used for the network setting, various settings may be made as long as the information of the default gateway is not obtained or used. For example, the information of the DNS server or the NTP server may be used for the network setting (regardless of whether the information is actually used or not). Note that if the information of the network address is obtained but other information such as the information of the default gateway is not obtained, the processing shown in FIG. 8 need not be executed. A setting for a network interface not to be used among the plurality of network interfaces may be made for a case in which the network interface is activated. In this case, for the network interface not to be used, the network setting such that the default gateway is not set can be made, similar to the sub interface. However, for such network interface, the network setting including the information of the default gateway may be made, similar to the main interface. In this case, for example, if the network interface is set to be used as the sub interface, the information of the default gateway may be deleted.

Note that in the above-described embodiment, the network interface setting in the network camera 101 has been explained. The above-described method can be used in an arbitrary communication apparatus including a plurality of network interfaces. That is, if a main interface preferentially used should not be switched in the communication apparatus, a default gateway is set for the main interface and no default gateway is set for a sub interface. This can prevent a default route from being switched dynamically while performing communication using the plurality of network interfaces in parallel.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093977, filed May 15, 2018, which is hereby incorporated by reference herein in its entirety.

What is claimed is:

1. A communication apparatus including at least a first network interface and a second network interface, wherein the first network interface is connected to a first network and the second network interface is connected to a second network different from the first network, the communication apparatus comprising a computer executing instructions that, when executed by the computer, cause the computer to function as:
  an accepting unit configured to accept, from a user, an instruction for setting one of the first network interface and the second network interface as a main interface for which a default gateway is set and for setting another one of the first network interface and the second network interface as a sub-interface for which a default gateway is not set, wherein the main interface and the sub-interface are not permitted, without the instruction from the user, to be switched between each other;
  a default gateway setting unit configured to make a setting of a default gateway with respect to the one of the first network interface and the second network interface for which the instruction for setting as the main interface is accepted;
  an obtaining method setting unit configured to set
    a method for obtaining respective IP addresses of the first network interface and the second network interface, and
    a method for obtaining an IP address of an external server with which the communication apparatus performs communication via the one of the first network interface and the second network interface for which the instruction for setting as the main interface is accepted; and
  a communication control unit configured to control communications using the first network interface and the second network interface,
  wherein the obtaining method setting unit can set, as a method for obtaining an IP address, one of manual obtaining for setting an IP address input by a user and automatic obtaining in which a router connected to the network interface sets an IP address,
  if the method for obtaining an IP address of the one of the first network interface and the second network interface for which the instruction for setting as the main interface is accepted is the manual obtaining, and the method for obtaining an IP address of the external server is the automatic obtaining, setting related to the method for obtaining an IP address of the external server is not valid, otherwise the setting related to the method for obtaining an IP address of the external server is valid, and if the setting related to the method for obtaining an IP address of the external server is valid and the method for obtaining an IP address of the other one of the first network interface and the second network interface for which the instruction for setting as the sub-interface is accepted is the automatic obtaining, the communication control unit controls communications using the plurality of network interfaces by using at least the IP address, which is obtained by the automatic obtaining, of the other one of the first network and the second network interface for which the instruction for setting as the sub-interface is accepted without using the IP address of the external server obtained by the automatic obtaining via the other one of the first network and the second network interface for which the instruction for setting as the sub-interface is accepted and without setting a default gateway with respect to the other one of the first network and the second network interface for which the instruction for setting as the sub-interface is accepted.

2. The communication apparatus according to claim 1, wherein the computer executes the instructions that, when executed by the computer, cause the computer to further function as a reception unit configured to externally receive information indicating the IP address and information about the default gateway.

3. The communication apparatus according to claim 1, wherein the external server includes at least one of a DNS (Domain Name System) server and an NTP (Network Time Protocol) server.

4. The communication apparatus according to claim 1, wherein
the instruction for setting as the main interface is accepted for the first network interface, and the first network interface comprises a wired network interface, and
the instruction for setting as the sub-interface is accepted for the second network interface, and the second network interface comprises a wireless network interface.

5. A control method for a communication apparatus including at least a first network interface and a second network interface, wherein the first network interface is connected to a first network and the second network interface is connected to a second network different from the first network, the method comprising:
accepting, from a user, an instruction for setting one of the first network interface and the second network interface as a main interface for which a default gateway is set and for setting another one of the first network interface and the second network interface as a sub-interface for which a default gateway is not set, wherein the main interface and the sub-interface are not permitted, without the instruction from the user, to be switched between each other;
making a setting of a default gateway with respect to the one of the first network interface and the second network interface for which the instruction for setting as the main interface is accepted;
setting a method for obtaining respective IP addresses of the first network interface and the second network interface;
setting a method for obtaining an IP address of an external server with which the communication apparatus performs communication via the one of the first network interface and the second network interface for which the instruction for setting as the main interface is accepted; and
controlling communications using the first network interface and the second network interface,
wherein one of manual obtaining for setting an IP address input by a user and automatic obtaining in which a router connected to the network interface sets an IP address can be set as a method for obtaining an IP address,
if the method for obtaining an IP address of the one of the first network interface and the second network interface for which the instruction for setting as the main interface is accepted is the manual obtaining, and the method for obtaining an IP address of the external server is the automatic obtaining, setting related to the method for obtaining an IP address of the external server is not valid, otherwise the setting related to the method for obtaining an IP address of the external server is valid, and
if the setting related to the method for obtaining an IP address of the external server is valid and the method for obtaining an IP address of the other one of the first network interface and the second network interface for which the instruction for setting as the sub-interface is accepted is the automatic obtaining, the controlling the communications includes controlling communications using the plurality of network interfaces by using at least the IP address, which is obtained by the automatic obtaining, of the other one of the first network and the second network interface for which the instruction for setting as the sub-interface is accepted without using the IP address of the external server obtained by the automatic obtaining via the other one of the first network and the second network interface for which the instruction for setting as the sub-interface is accepted and without setting a default gateway with respect to the other one of the first network and the second network interface for which the instruction for setting as the sub-interface is accepted.

6. A non-transitory computer-readable storage medium that stores a program for causing a computer, provided in a communication apparatus including at least a first network interface being connected to a first network and a second network interface being connected to a second network different from the first network, to:
make a method for obtaining respective IP addresses of the first network interface and the second network interface;
set a method for obtaining respective IP addresses of the first network interface and the second network interface;
set a method for obtaining an IP address of an external server with which the communication apparatus performs communication via the one of the first network interface and the second network interface for which the instruction for setting as the main interface is accepted; and
control communications using the first network interface and the second network interface,
wherein one of manual obtaining for setting an IP address input by a user and automatic obtaining in which a router connected to the network interface sets an IP address can be set as a method for obtaining an IP address,
if the method for obtaining an IP address of the one of the first network interface and the second network interface for which the instruction for setting as the main interface is accepted is the manual obtaining, and the method for obtaining an IP address of the external server is the automatic obtaining, setting related to the method for obtaining an IP address of the external server is not valid, otherwise the setting related to the method for obtaining an IP address of the external server is valid, and if the setting related to the method for obtaining an IP address of the external server is valid and the method for obtaining an IP address of the other one of the first network interface and the second network interface for which the instruction for setting as the sub-interface is accepted is the automatic obtaining, the control of the communications includes controlling communications using the plurality of network interfaces by using at least the IP address, which is obtained by the automatic obtaining, of the other one of the first network and the second network interface for which the instruction for setting as the sub-interface is accepted without using the IP address of the external server obtained by the automatic obtaining via the other one of the first network and the second network interface for which the instruction for setting as the sub-interface is accepted and without setting a default gateway with respect to the other one of the first network and the second network interface for which the instruction for setting as the sub-interface is accepted.

7. The communication apparatus according to claim 1, wherein the computer executes the instructions that, when executed by the computer, cause the computer to further function as a notification unit configured to, in a case where the setting related to the method for obtaining an IP address of the external server is not valid, notify a message indicating that it is impossible to automatically obtain an IP address of the external server with which the communication apparatus performs communication via the one of the first network interface and the second network interface for which the instruction for setting as the main interface is accepted.

* * * * *